United States Patent
Komar et al.

(10) Patent No.: US 6,766,100 B1
(45) Date of Patent: Jul. 20, 2004

(54) METHOD AND APPARATUS FOR MULTI-TV TUNER DISPLAY OF VIDEO INFORMATION

(75) Inventors: Anton V. Komar, Toronto (CA); Jitesh Arora, Markham (CA); Elena Mate, Toronto (CA)

(73) Assignee: ATI International SRL, Christchurch (BB)

( * ) Notice: Subject to any disclaimer, the term of this patent is extended or adjusted under 35 U.S.C. 154(b) by 352 days.

(21) Appl. No.: 09/691,876

(22) Filed: Oct. 19, 2000

(51) Int. Cl.$^7$ ................................................. H04N 5/91
(52) U.S. Cl. ............................ 386/46; 386/83; 348/564
(58) Field of Search ............................. 386/46, 68, 70, 386/125–126, 109, 110, 111, 82, 83; 348/565, 567, 731–733, 564, 706; H04N 5/91

(56) References Cited

U.S. PATENT DOCUMENTS

| | | | |
|---|---|---|---|
| 4,808,992 A | * | 2/1989 | Beyers, Jr. et al. ......... 348/706 |
| 5,371,551 A | * | 12/1994 | Logan et al. ................ 348/571 |
| 6,018,612 A | * | 1/2000 | Thomason et al. ........... 386/82 |
| 6,115,341 A | * | 9/2000 | Hirai ............................ 369/59 |
| 6,285,408 B1 | * | 9/2001 | Choi et al. .................. 348/555 |

FOREIGN PATENT DOCUMENTS

WO    WO 92/22983    * 12/1992    .......... H04N/5/781

* cited by examiner

*Primary Examiner*—Vincent Boccio
(74) *Attorney, Agent, or Firm*—Vedder, Price, Kaufman & Kammholz, P.C.

(57) ABSTRACT

A method and system controls multiple TV tuners to allow a user to watch live video at high quality based on a video capture level independent of a video capture quality used to record playback video. The method and system provides an independent TV tuner from which to capture video that will be replayed wherein the capture quality of the video from the tuner will be independent from the quality other tuner. Accordingly, an delayed video stream can have a lower capture quality setting without affecting the capture quality of primary video being viewed by a user.

19 Claims, 5 Drawing Sheets

FIG. 4
(REPLAY CONFIGURATION)

FIG. 5

METHOD AND APPARATUS FOR MULTI-TV TUNER DISPLAY OF VIDEO INFORMATION

RELATED CO-PENDING APPLICATION

This is a related application to co-pending application entitled "METHOD AND APPARATUS FOR MULTI-TV TUNER DISPLAY OF VIDEO INFORMATION", filed on Feb. 28, 2000, having the same inventors Komar et al., Ser. No. 09/514,836 and owned by instant assignee.

FIELD OF THE INVENTION

The invention relates generally to methods and apparatus for displaying video and more particularly to methods and apparatus for displaying video employing multiple TV tuners.

BACKGROUND OF THE INVENTION

Multimedia systems may employ a single TV tuner that may be employed as part of a graphics processing system. For example, a combination graphics processing and TV tuner may allow the display of an incoming TV information from satellite or cable television input or other video source to be overlaid on graphics information on a screen hooked up to a computer. Such systems can allow selection of capture quality so that a single decoder captures all video at a selected capture resolution. However, where a viewer is watching television on a such a screen and would like to watch portions of two television shows that are on the air at the same time, the viewer typically has to decide which program the viewer would like to see displayed on a display device since the TV tuner can only receive a single channel and display the single channel. Also, where the viewer would like watch a program on one channel and generate their own replay for the same channel or a different channel, a single tuner system typically would record the video for replay at a same quality level as the quality of the live video area. This can greatly tax the performance and processing abilities of such systems.

In addition, there are single TV tuner systems known that can provide the detection of key words based closed caption data to monitor a current channel and put a TV image in the background and bring the TV image into the foreground when the key word or phrase is detected. Accordingly, "hot words" are an information pattern that is entered by a user and are compared with the incoming source stream. Recording can be started based on the key words detection in the single channel. However, such systems do not typically provide multi-channel detection and typically require a viewer to manually switch to a different channel through the single tuner when a different program is desired. This solution is inconvenient if the user wants to watch or capture segments of two programs that are on at the same time since "hot words" can only typically be used to monitor the current channel.

Dual TV tuner systems are known that may be included, for example, in a television system. Such television systems do not typically offer multimedia capabilities including video graphics processing. However, such conventional dual tuner televisions typically provide a picture within a picture option but typically do not allow the delayed viewing of one program. Also, where a picture in a picture mode is used, this can distract the user who is wishing to detect when a particular program or other information is provided because the viewer must divide their attention between two channels.

In addition, combination television and VCR's are known. In such a system, typically the TV includes one TV tuner and the VCR includes another TV tuner but the VCR provides analog recording. Also, such systems typically use separate control devices for each of the tuners and do not typically allow the user to view the captured video while capturing. A user must typically wait until the tape is finished and rewind the tape.

It would be desirable if a viewer watching delayed and live video could simultaneously watch both video streams at independent capture quality levels from one another. Conventionally, delayed video is recorded at a lower capture quality setting. In a single tuner configuration this also reduces the quality of the live video stream since the same quality setting is typically required for both the live video and recorded video.

It would also be desirable if a viewer could watch video received on one channel while simultaneously recording video from the same channel or another channel while keeping the quality of the primary channel being watched unaffected.

In one tuner system, one solution may be to capture (and record) the video stream at the highest possible quality setting for delayed video as with the live video and then downscaling the video using a suitable downscale, for example, using a graphics processor or other suitable circuit. However, recording high quality video requires increased processing and storage space.

Accordingly, a need exists for a video display apparatus and method that can overcome one or more of the above problems.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

Briefly, a method and system uses multiple TV tuners and allows independent capture quality of live video and replay video. The method and system provides an independent TV tuner from which to capture video that will be replayed wherein the decoder capture quality of the video from one tuner will be independent from the decoder capture quality of the other tuner. Accordingly, a delayed video stream can have a lower capture quality setting without affecting the capture quality of primary video being viewed by a user.

In one embodiment, a multi-television tuner system includes a first tuner, a second tuner, and a common controller that provides an independent capture quality for video received from the first tuner and video received from the second tuner. Memory is included that is used to digitally store video received from a selected one of the first and second tuner for controlled playback. The dual TV tuner system may be, for example, a set top TV appliance, computer system, or other device that provides a plurality of TV tuners in a same system.

Figure 1:
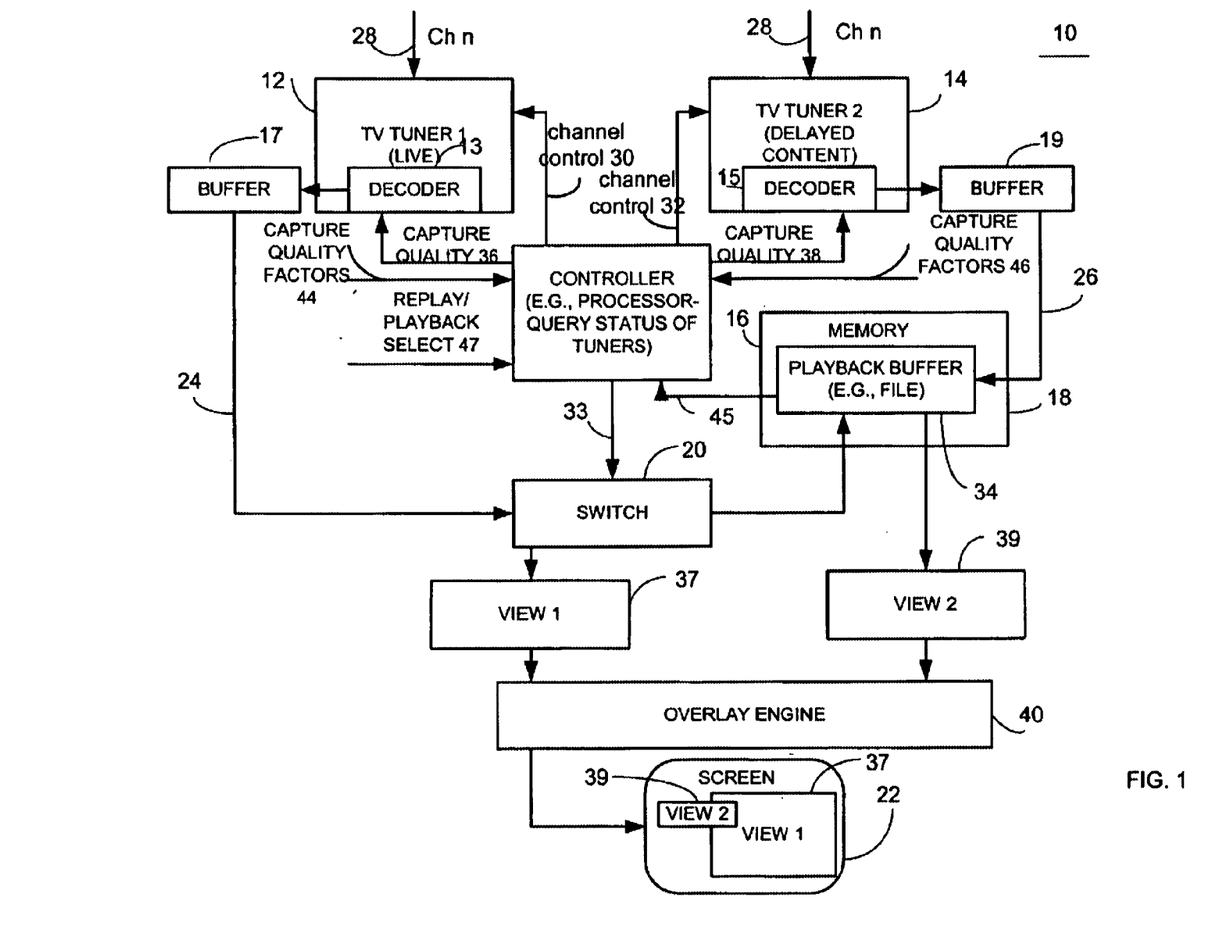
FIG. 1 is a block diagram illustrating one example of a multi-television tuner system in accordance with one embodiment of the invention.

FIG. 1 illustrates one embodiment of a multi-television tuner system 10 for displaying video. The system 10 includes a first TV tuner 12, a second TV tuner 14, a common processing device such as a common controller 16, memory 18, switch 20 (shown functionally), an overlay engine 40, and a display device 22, such as a progressive computer screen, CRT, LCD or any other suitable display device. By way of illustration only, and not limitation, the apparatus 10 will be described with reference to a multimedia personal computer system. However, it will be recognized by one of ordinary skill in the art that the disclosed invention may be employed as part of a television, handheld Internet appliance or any other suitable device or system employing a display device.

The TV tuners 12 and 14 may be any suitable TV tuners that may receive digital or analog video and audio information for display on display 22 and vertical blanking interval (VBI) information (e.g., closed captioning or parental control). Where the first and second TV tuners 12 and 14 are analog TV tuners, they include, as known in the art, decoders 13 and 15 to perform digital to analog conversion and to output captured digital data 24 and 26 to respective buffers 17 and 19. The buffers may be, for example, system memory or if desired, frame buffer memory.

The first TV tuner 12 is operatively coupled to receive incoming signal 28, such as incoming video information from a television signal source in digital or analog form. If the incoming signal is digital information, the TV tuner decoder decompresses the information and/or performs a YUV format conversion if necessary. The first TV tuner 12 is operatively coupled to receive incoming signals for a first channel. As used herein, the term "channel" may include any suitable frequency or code or any other suitable delineation used to distinguish among channel containing differing video information. The second TV tuner 14 is also operatively coupled to receive the incoming signal 28 and is tuned for a second and different channel. Accordingly, the first TV tuner is tuned to receive a first channel, and the second TV tuner 14 is controlled to receive a second and different channel. Channel control of the TV tuners 12 and 14 is performed by common controller 16 via channel control data 30 and 32, respectively. The common controller 16 is operatively coupled to both the first and second tuners to provide this information so that it can control the first tune 12 to receive first incoming signals for a first channel and to control the second tuner 14 to receive second incoming signals associated with the first channel or a second channel. The common controller 16 provides an independent display quality for video received from the first tuner in comparison with video received with the second tuner.

Memory 18 is operatively coupled to digitally store video received from a selected one of the first and second tuners for controlled playback. As such, the memory 18 includes a playback buffer that may store, for example, a playback file 34. Memory 18 may be, for example, the system memory or frame buffer memory so that the playback file 34 may be suitably stored wherever selected.

Switch 20 is controlled by the common controller 16 via control signal 33 to switch, for example, the digital video 24 to be stored, for example, for replay in a playback file 34 or to output the digital video 24 as a display view 37 for viewing on the display 22. Although control of the channel selection is made through channel select commands 30 and 32, it will be recognized that any other suitable channel select control mechanism to control TV tuners 12 and 14 may also be used.

The common controller 16 controls the capture quality independently for each of the decoders 13 and 15. Capture quality setting information 36 and 38 may be, for example, a setting indicating that the decoder should capture the video at a 320×240 resolution, or HDTV level resolution, or any other suitable capture resolution. The common controller 16 may be, for example, one or more suitably programmed microprocessors, DSPs, discrete logic, state machines or any other suitable hardware, software, or suitable combination thereof to perform the described operations.

For purpose of illustration, in this example, the decoder 13 of TV tuner 12 has a higher capture quality setting 36 than the capture quality setting for decoder 15. The incoming signals received by tuner 12 will be considered the primary video or, for example, live video, whereas the incoming channel set for TV tuner 14 is the channel from which delayed video is recorded for playback and is considered the secondary tuner (these may be the same channels). However, it will be recognized that each tuner may be selected as a primary tuner or a secondary tuner.

In addition, the capture quality settings information 36 and 38 may be predetermined so that tuner 12 always has a higher capture quality setting so that the common controller 16 can suitably control each tuner through the channel control commands 30 and 32 so that either tuner can be used to capture playback information, for example, if playback information is desired at a higher capture quality than, for example, live video. However, preferably, delayed video or playback video is typically recorded at a lower capture resolution to reduce the processing demands on the common controller 16 or graphics processing devices.

As shown, overlay engine 40 may suitably downscale and overlay one of two views 37 or 39 captured from the decoders 13 and 15 to the display 22 so that, for example, the same show may be watched while, for example, playback or replay is being shown as an overlaid view.

The overlay engine 40 may be any suitable overlay engine as known in the art such as part of a 3D graphics processor, to overlay, for example, video and graphics information or two videos, if desired. The overlay engine as known in the art can upscale or downscale images as desired for placement and viewing in the display 22. The display resolution for each view is therefore affected by the overlay engine. Capture resolution of the decoders 13 and 15 may be different from the display resolution of each of the respective views depending upon the desired overlay configuration. The overlay engine 40 may also be incorporated as part of the common controller 16 if desired.

Where the capture quality for each decoder (i.e., each tuner) is not preprogrammed, the system 10 may provide, for example, a user interrace so that a user may enter quality factors 44 and 46 to define the desired decoder capture quality for each of the tuners 12 and 14. For example, an interface may allow quality factors that include, for example, capture size and capture duration on a per tuner basis. The common controller 16 then defines the allowable memory space in the buffers 17 and 19 to reflect the capture quality setting as determined by the quality factors. The quality factors may be stored, for example, in suitable tuner registers.

The common controller 16 commonly controls the first tuner 12 based on a selectable first capture quality setting 36 that may be derived, for example, from the input capture quality factors 44. The common controller 16 also controls the second tuner 14 at an independent selectable capture quality setting. The video received from the first tuner is captured at a first quality level simultaneously with video received from the second tuner which is captured at a second and independent capture quality level. Accordingly, the common controller 16 allows the decoders 13 an 15 to digitally capture video simultaneously at differing capture quality settings. As such, the common controller 16 provides independent display quality for video received from the first tuner and video received with the second tuner.

The common controller 16 also determines a current channel of each tuner and controls both tuners to receive the same channel in response to a replay activation signal 47 received, for example, through a remote control device. For example, where a viewer is watching live video via tuner 12, the common controller 16 controls both tuners 12 and 14 to receive the same channel so that the second tuner 14 can store captured video, for example, at an independent capture quality level as a playback file 34 so that the viewer can continue, for example, to view the same program while also reviewing a replay of the same program. Alternatively, the TV tuners 12 and 14 may be tuned to different channels so the viewer may be viewing live video from one channel, for example, and tuner 2 is programmed to receive a different channel from which the playback may be desired. Accordingly, the common controller 16 controls digital capturing by obtaining status and other information on the first and second tuners to record from a same or different channel. Status information may be, for example, the current channel to which each tuner is programmed. The other information may be from a selected channel viewer or remote control or other suitable source indicating the desired channel from which a replay segment is desired. The playback buffer is monitored by the common controller 16 to obtain playback status information 45 for the user, such as the time that the delayed video program occurred, or any other suitable information.

Where a start replay command is received, such as the playback select command 46, the common controller 16 monitors the channels prior to this time on the first and second tuners and programs the other tuner to receive the same channel as the first tuner so that the replay of a currently live program is readily obtained at a different capture quality as determined by the capture quality factors 44 and 46.

Figure 2:
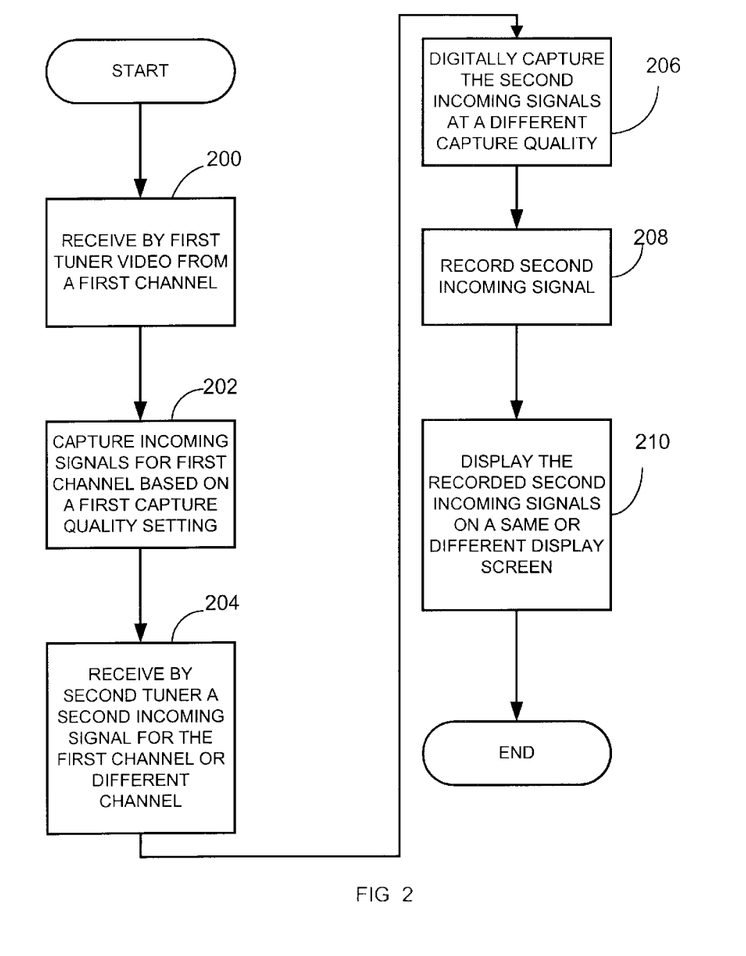
FIG. 2 is a flow chart illustrating a method for controlling a plurality of TV tuners in accordance with one embodiment of the invention.

Referring to FIG. 2, a method for controlling a plurality of TV tuners as carried out by system 10 or other system is shown. As shown in block 200, the method includes receiving by a first tuner, video from a first channel. As shown in block 202, the method includes capturing incoming signals for a first channel based on a first capture quality setting. As shown in block 204, the method includes receiving, by a second tuner, a second incoming signal for the first channel or a different channel if desired.

At step 206, the method includes digitally capturing the second incoming signal at a different capture quality based on either the quality factor 44 or a preprogrammed capture quality setting. As shown in block 208, the method includes recording for playback, such as in playback file 34, the second incoming signals. As shown in block 210, the method includes displaying the recorded second incoming signals on the same or different display screen along with the first incoming signals so that simultaneous display of a live video and a recorded playback is provided.

Figure 3:
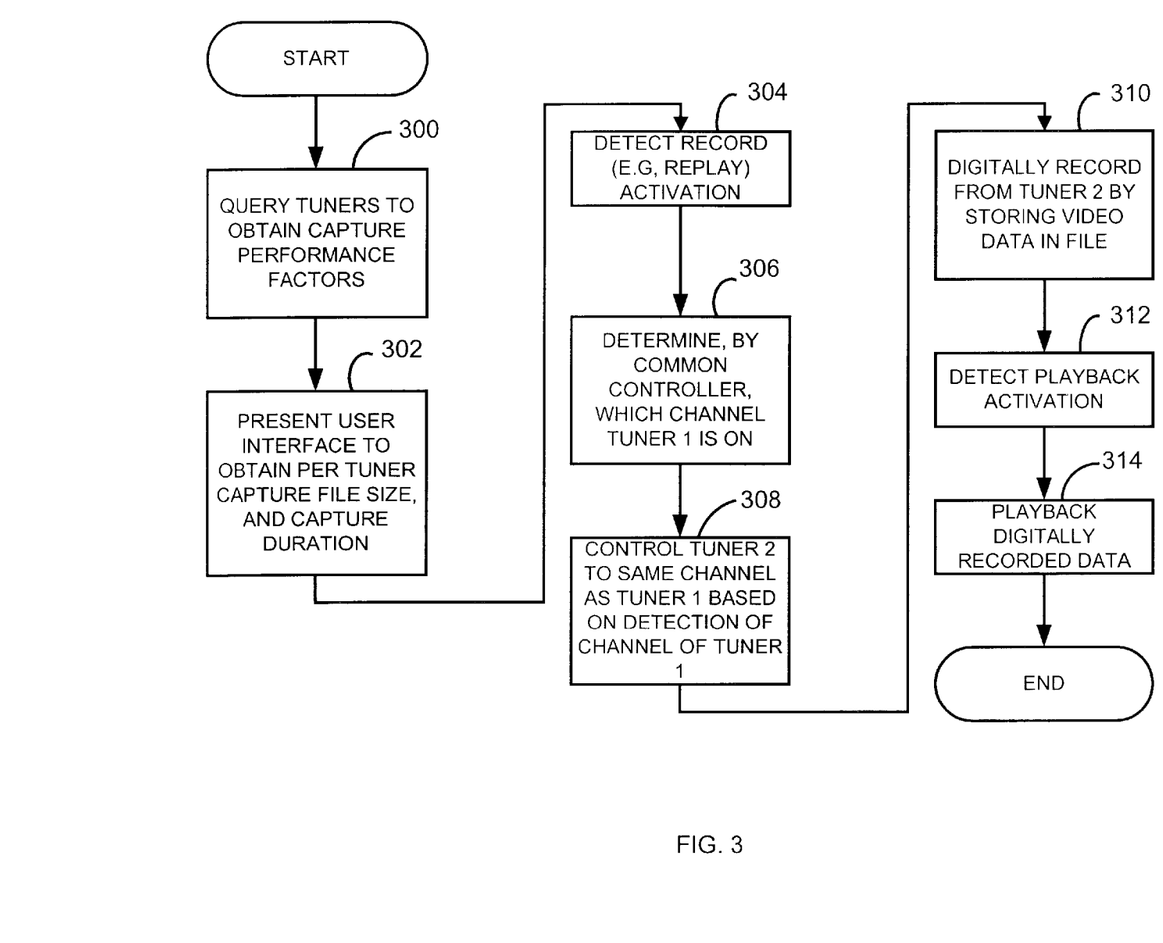
FIG. 3 is a flow chart illustrating one example of a method for controlling a plurality of TV tuners in accordance with one embodiment of the invention.

FIG. 3 illustrates a method for controlling a plurality of TV tuners wherein a user interface is used to obtain capture quality factors 44 and 46 for a plurality of TV tuners. As shown in block 300, the method includes the common controller 16 querying the tuners 12 and 14 to obtain performance capture factors, such as by reading suitable registers to determine, for example, a current setting of the capture resolution and capture duration for each tuner. As shown in block 302 the method includes presenting a user interface to a user to obtain per tuner capture file size and capture duration settings to modify the capture quality for each of the decoders 13 and 15. The method includes monitoring for the playback select information 47 to detect a replay or record activation signal, such as from a remote control device or any other suitable source. As shown in block 306, the method includes determining, by the common controller, for example, which channel the TV tuner 12 is on. As shown in block 308, the method includes controlling the second TV tuner 14 to the same channel as TV tuner 12 based on detection of the channel of the first tuner 12. The method includes controlling the first tuner based on the selectable first capture quality settings as received via a user interface based on the capture quality factors 44 and also controlling the second tuner at a different selectable capture quality setting based on, for example, the capture quality factors 46. It will be recognized that the capture quality factors 44 and 46 may be the selectable first capture quality settings. Since the record activation command was detected, the method includes digitally recording from second tuner 14 the video received by the second tuner as playback video by storing captured video data in file 34 as shown in block 310. As shown in block 312, when a user, for example, again selects that the playback of the stored video is required, the common controller detects the playback activation via the playback select information 46. The method includes then playing back the digital recorded data in the playback file via overlay engine 40 onto the screen 22 as shown in block 314.

Accordingly, based on the above methodology, the method includes determining, in response to replay activation, a current channel of each tuner controlling both tuners to receive a same channel. The method also includes controlling a capturing of video by obtaining status and other information on each of the tuners to record from a same or different channel if, for example, the controller receives other control information indicating, for example, that the user desires to record from a channel other than that being received by tuner 12. This may be via a different input (not shown). Through the user interface, the method includes prompting to receive data indicating capture file size and capture duration and using the per tuner capture quality settings to set a different capture quality level for each of the tuners.

Figure 4:
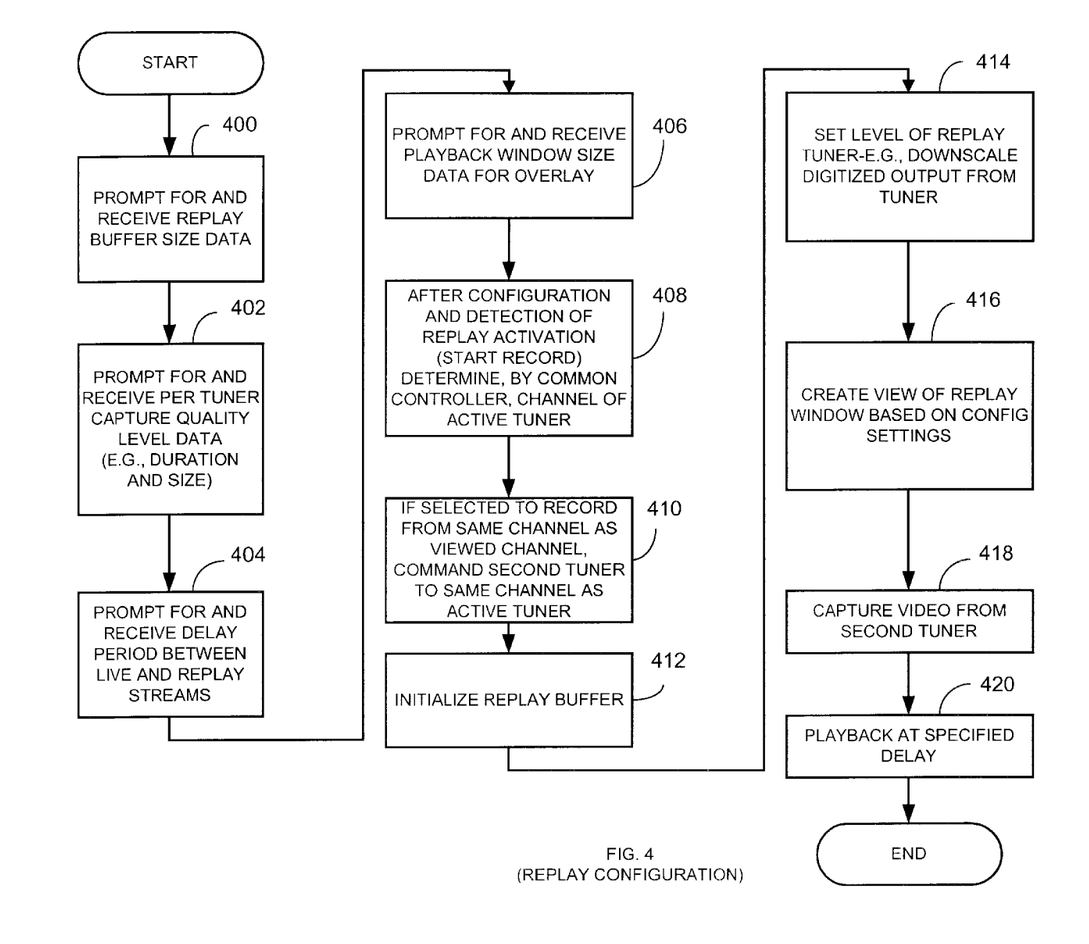
FIG. 4 is a more detailed flow chart illustrating one example of a method for controlling a plurality of tuners in accordance with one embodiment of the invention.

FIG. 4 illustrates in more detail a method for controlling a plurality of TV tuners in accordance with one embodiment of the invention. As shown in block 400, the method includes prompting for and receiving, such as through a user interface, or from data in registers or another suitable location, replay buffer size data that defines, for example, the size of the playback file 34 or other suitable replay buffer size. The method includes having the common controller then set aside, or having the host processor set aside, the requisite replay buffer for later recorded video. As shown in block 402, the method includes prompting for and receiving per tuner capture quality level data as described, for example, with respect to FIG. 3 to obtain the per tuner capture file size and capture duration information. As shown in block 404, the method includes prompting for and receiving a delay period between live and video replay streams. For example, user interface may provide a user with the selection of the amount of time that lapses a time that live video is presented on the screen and the time between for a playback file to be displayed. The user may interactively change the delayed value during the playback to review a specific event, such as the scoring of a goal. If the user wants to view it again, a new time delay must be set since the event is now further into the past.

As shown in block 406, the method includes prompting for and receiving playback window size data for the playback window such as view 39 that will be used by the overlay engine to suitably size the playback window on the display 22. Information may be suitably stored for use by the overlay engine in control registers as known in the art of graphics processing, or in any suitable location. As shown in block 408, the method includes, after configuration and detection of replay activation, determining, by the common controller, the channel of the active tuner, such as TV tuner 12. As shown in block 410, if the common controller is selected to record from the same channel as the channel being viewed, the common controller commands the second tuner 14 to the same channel as the active tuner 12. As shown in block 412, the replay buffer is then initialized to accept decoded video from decoder buffer 19. As shown in block 414, the method includes setting the overlay engine downscaling to set a replay window size. As shown in block 416, the method includes creating the view of the replay window based on the configuration settings, such as by the overlay engine 40. As shown in block 418, the method includes capturing the video from the second tuner and in block 420, playing back the playback file 34 at the specified playback delay, specified, for example, in step 404.

Figure 5:
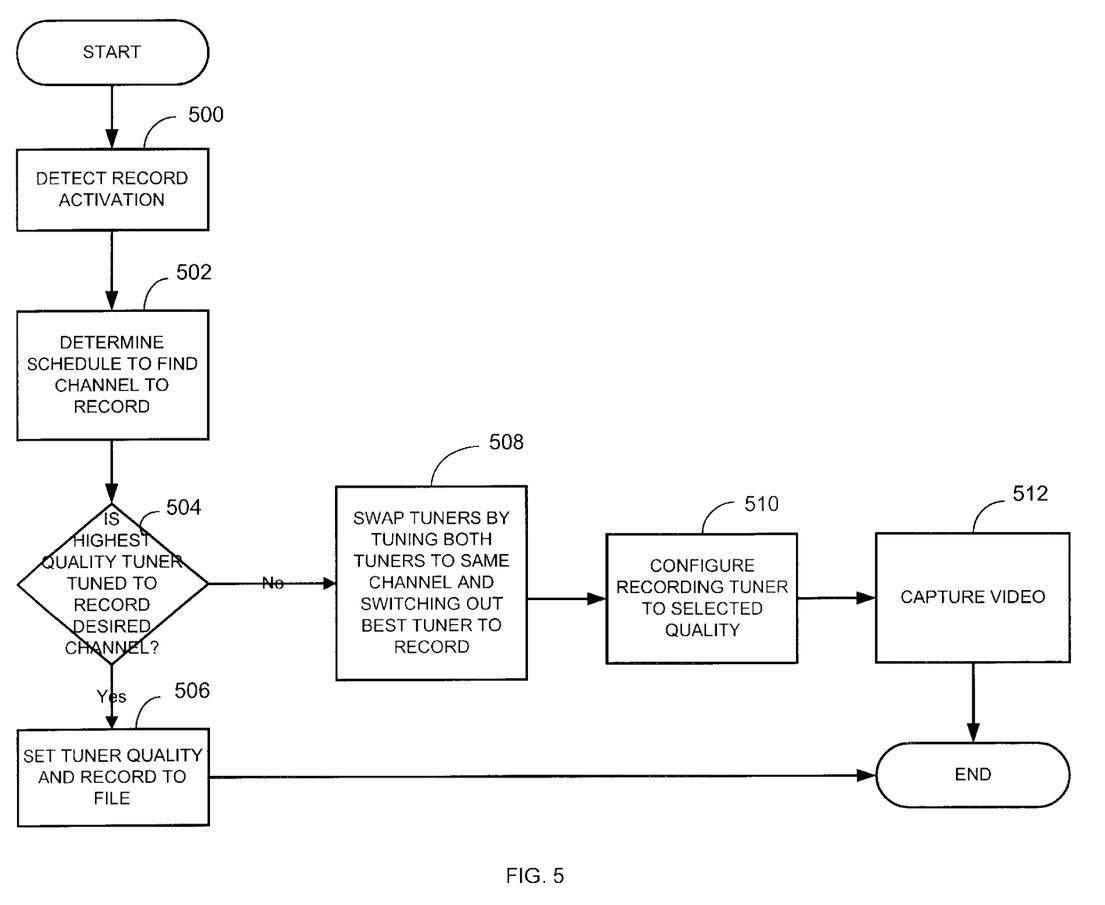
FIG. 5 is a flowchart illustrating one method for controlling a plurality of TV tuners where multiple TV tuners are not originally set to a same channel but the highest capture quality tuner is used to record video for replay.

FIG. 5 illustrates an alternative method for controlling a plurality of tuners that may be implemented, for example, by the system shown in FIG. 10 or any other suitable system. In this embodiment, each of the TV tuners is set to a different capture quality setting. In addition, the system is used so that it will record differing channels on the two different tuners. In block 500, the method includes detecting a record activation signal, such as from a remote device, timer, or content detection mechanism or any other suitable source as shown in block 500. As shown in block 502, where a programming schedule is available, the method includes determining the schedule to find the channel to record, such as accessing the programming schedule in order to determine the appropriate channel from which to record. As shown in block 504, the method includes determining if the best tuner is tuned to record the desired channel. Since both tuners may not have the same quality capture capabilities, i.e., one has a higher capture quality level and the other has a lower capture quality, the recording tuner should be set to the one that has the desired quality. For example, in this embodiment, it is desired to obtain a high capture quality and to set to tuner with the highest quality recording for playback. If the highest quality tuner, such as the tuner with the highest capture quality setting, is already tuned to record the desired channel, the method includes, as shown in block 506, setting the tuner to the desired quality, if, for example, the user desires to change the quality setting, and begin recording video to the playback file. The goal is to record at the specified independent quality, which may or may not be the highest quality. If one tuner is a low quality tuner and the setting is a high quality record setting, the highest quality tuner becomes dedicated to recording. If the user wishes to change a channel, the user can view the channel at a low quality while the high quality tuner continues to record.

If, however, the highest quality tuner is not tuned to the desired channel, the method includes, as shown in block 508, switching tuners by tuning both tuners to the same channel and switching out the best tuner to record on the desired channel so that the user may, for example, continue to watch a program although watching it with a different tuner than originally being used. As shown in block 510, the method includes configuring a recording tuner to the selected quality setting if, for example, the capture quality has changed. As shown in block 512, the method includes capturing the video and recording it as the playback file.

As described herein, a plurality of tuners are provided with differing capture quality for the respective decoders. The selectability of the capture quality may be done, for example, through a user interface or, for example, the capture quality may be preset on a per tuner basis. If preset on a per tuner basis, for example, the system and method may automatically switch tuners to the tuner having the higher capture quality for recording content, if desired. The low capture quality may also be used for recording video to reduce process loading. Other advantages will be recognized by those of ordinary skill in the art.

It should be understood that the implementation of other variations and modifications of the invention in its various aspects will be apparent to those of ordinary skill in the art, and that the invention is not limited by the specific embodiments described. For example, more than two tuners may be used. Also, the common controller and overlay engine can be implemented as a graphic processor. It is therefore contemplated to cover by the present invention, any and all modifications, variations, or equivalents that fall within the spirit and scope of the basic underlying principles disclosed and claimed herein.

What is claimed is:

1. A multi-television tuner system comprising:
a first tuner;
a second tuner;
a common controller, operatively coupled to both the first and second tuner, to control the first tuner to receive first incoming signals for a first channel, control the second tuner to receive second incoming signals associated with the first channel or a second channel; selecting one of the first and second tuners for controlled playback and the other tuner for non-controlled playback, and provide an independent capture quality for video received with the first tuner and video received with the second tuner; and
memory operatively coupled to digitally store video received from a selected one of the first and second tuner for controlled playback.

2. The system of claim 1 wherein the common controller controls the first tuner based on a selectable first capture quality setting and controls the second tuner at a different selectable capture quality setting and wherein a display from the first tuner is captured at a first quality level simultaneously with a video received from the second tuner at a different and second capture quality level.

3. The system of claim 1 wherein the common controller controls recording by obtaining status and other information on the first and second tuners to record from a same or different channel.

4. The system of claim 1 including a user interface adapted to receive data indicating at least one of a capture file size, and capture duration and wherein the common controller uses the per tuner capture quality settings to set a different capture quality level for each of the first and second tuners.

5. The system of claim 1 wherein first tuner is a primary tuner wherein video received with the primary tuner is captured at a selectable first quality level; and wherein the second tuner is a secondary tuner wherein the video received with the second tuner is captured at a selectable different and second quality level.

6. A multi-television tuner system comprising:

a first tuner;

a second tuner;

a processing device operatively coupled to the first and second tuners; and memory containing instructions that when executed by the processing device cause the processing device to:

control the first tuner to receive first incoming signals at a first capture quality for the first incoming signals for the first channel;

control the second tuner to receive second incoming signals associated with the first channel or a second channel;

control capturing of at least a portion of the second incoming signals received by the second tuner at a different capture quality in response to obtaining channel identification information associated with each of the first and second tuners.

7. The system of claim 6 wherein the processing device controls the first tuner based on a selectable first capture quality setting and controls the second tuner at a different selectable capture quality setting and wherein a display from the first tuner is displayed simultaneously with a display received from the second tuner that was captured at a different and second capture quality level.

8. The system of claim 6 wherein the processing device, in response to replay activation, determines a current channel of each tuner and controls both tuners to receive a same channel.

9. The system of claim 6 wherein the processing device controls recording by obtaining status and other information on the first and second tuners to record from a same or different channel.

10. The system of claim 6 including a user interface adapted to receive data indicating at least one of a capture file size, and capture duration and wherein the controller uses the per tuner capture quality settings to set a different capture quality level for each of the first and second tuners.

11. The system of claim 6 wherein the first tuner is a primary tuner wherein video received with the primary tuner is captured at a selectable first quality level; and wherein the second tuner is a secondary tuner wherein the video received with the second tuner is captured at a selectable different and second quality level.

12. The system of claim 6 wherein the processing device monitors channels on the first and second tuners and programs the other tuner to receive a same channel as the first tuner in response to a start replay command.

13. A method for controlling at least a first TV tuner and a second TV tuner comprising the steps of:

receiving, by a first TV tuner, first incoming signals for a first channel;

capturing the incoming signals for the first channel at a first capture quality setting;

receiving, by a second TV tuner, second incoming signals for the first channel or a second channel;

digitally capturing, at least a portion of the second incoming signals received by the second TV tuner at a different capture quality;

determining, in response to replay activation, a current channel of each tuner and controlling both tuners to receive a same channel; and displaying at least a portion of the second incoming signals on a same or different display screen.

14. The method of claim 13 including the step of controlling the first tuner based on a selectable first capture quality setting and controlling the second tuner at a different selectable capture quality setting.

15. The method of claim 13 including controlling capturing by obtaining status and other information on the first and second tuners to record from a same or different channel.

16. The method of claim 13 including the step of prompting to receive data indicating at least one of a capture file size, and capture duration and using the per tuner capture quality settings to set a different capture quality level for each of the first and second tuners.

17. The method of claim 13 including the step of monitoring channels on the first and second tuners and programming the other tuner to receive a same channel as the first tuner in response to a start replay command.

18. A multi-television tuner system comprising:

a first tuner;

a second tuner;

a common controller, operatively coupled to both the first and second tuner, to control the first tuner to receive first incoming signals for a first channel, control the second tuner to receive second incoming signals associated with the first channel or a second channel; and provide an independent capture quality for video received with the first tuner and video received with the second tuner;

memory operatively coupled to digitally store video received from a selected one of the first and second tuner for controlled playback; and wherein the common controller, in response to replay activation, determines a current channel of each tuner and controls both tuners to receive a same channel.

19. A multi-television tuner system comprising:

a first tuner;

a second tuner;

a common controller, operatively coupled to both the first and second tuner, to control the first tuner to receive first incoming signals for a first channel, control the second tuner to receive second incoming signals associated with the first channel or a second channel; and provide an independent capture quality for video received with the first tuner and video received with the second tuner;

memory operatively coupled to digitally store video received from a selected one of the first and second tuner for controlled playback; and wherein the common controller monitors channels on the first and second tuners and programs the other tuner to receive a same channel as the first tuner in response to a start replay command.

* * * * *